June 20, 1961 W. D. ROWE 2,989,663

BISTABLE TRIGGER CIRCUIT UTILIZING TRANSISTORS

Original Filed June 14, 1954

WITNESSES

Edwin E. Bassler

James F. Young

INVENTOR

William D. Rowe

BY

Paul E. Friedemann

ATTORNEY

United States Patent Office 2,989,663

Patented June 20, 1961

2,989,663

BISTABLE TRIGGER CIRCUIT UTILIZING TRANSISTORS

William D. Rowe, Snyder, N.Y., assignor to Westinghouse Electric Corporation, East Pittsburgh, Pa., a corporation of Pennsylvania Continuation of application Ser. No. 436,289, June 14, 1954. This application Jan. 19, 1959, Ser. No. 787,505

9 Claims. (Cl. 315—207)

This invention relates generally to triggering circuits and more particularly to triggering circuits making use of transistor means as an active circuit element therein, and is a continuation of the application filed by the same applicant, Serial No. 436,289, filed June 14, 1954, and entitled Junction Transistor Bistable Flip-Flop Circuit.

In the prior art it has been known to use point contact type transistors in bistable triggering circuits. While these circuits have been very reliable, have very low power consumption and small physical size as compared to electron tube circuits having the same function, they have certain disadvantages in that only special types of point contact transistors are adapted for use in such circuits and that each transistor has to have a circuit engineered around it inasmuch as point contact transistor characteristics vary widely. Additionally, since point contact transistors are made by expensive methods using micromanipulation, it is desirable to utilize less expensive semiconductor devices in their stead.

Accordingly, one object of this invention is to provide a bistable triggering circuit making use of junction transistors.

Another object of this invention is to provide a bistable transistorized triggering circuit that will operate with fixed circuit constants without regard to variations in characteristics of individual transistors used therein.

Still another object of this invention is to provide a relatively simple bistable transistorized triggering circuit making use of relatively few component parts.

Figure 1:
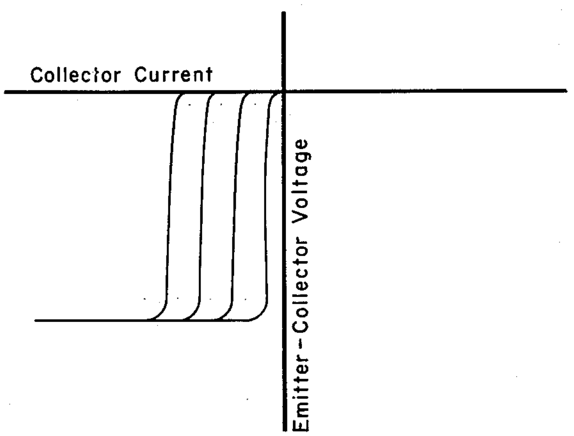
Figure 2:
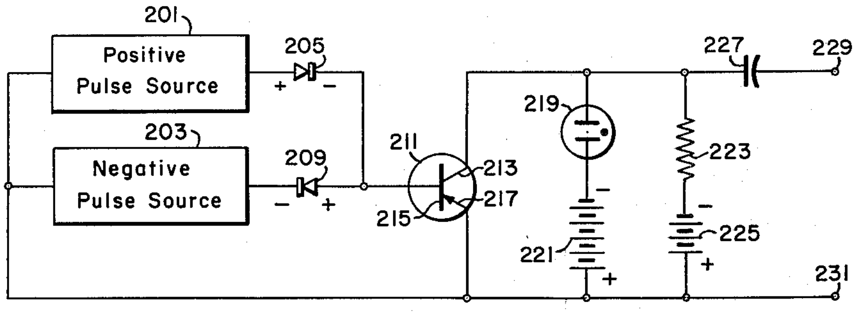
Figure 3:
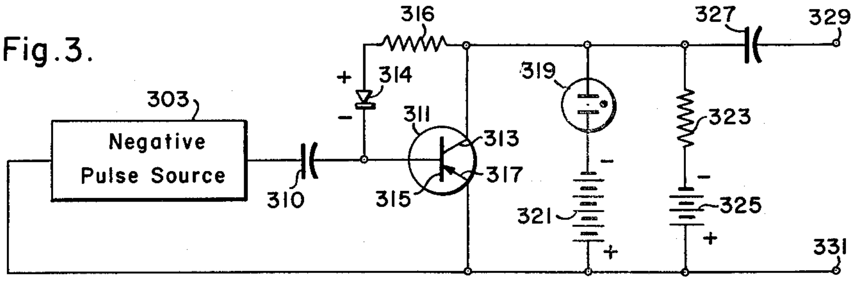

Other objects and features of this invention will become apparent upon consideration of the following detailed description when taken in connection with the accompanying drawings, in which:

FIGURE 1 shows a graph of the emitter-collector voltage of a junction type transistor as a function of the collector current; and FIGS. 2 and 3 are circuit diagrams of two preferred embodiments of this invention.

It has been known for some years that a critical voltage placed across a p-n junction in the "reverse current" direction thereof will cause the current through the junction to increase abruptly as compared to the increase obtained with lower voltages across the junction. The phenomenon is discussed by K. B. McAfee et al. in the Physical Review, vol. 83, p. 650 and in an article by E. M. Conwell in Proc. I.R.E., vol. 40, No. 11, p. 1327 at p. 1333. This critical voltage, commonly known as the "Zener breakdown voltage," has also been observed in connection with both p-n-p and n-p-n type junction transistors. In FIG. 1 there is shown a family of curves illustrating the Zener breakdown phenomenon. As can be observed, for each emitter-base voltage imposed upon the transistor, the collector current will increase to a given value at a very low emitter-collector voltage, increasing very slowly thereafter with increase in emitter-collector voltage until the Zener voltage is reached. At this point, the potential barrier interposed by the base in effect breaks down and the current increases very rapidly, becoming substantially independent of emitter-collector voltage.

In one aspect of this invention, a junction type transistor having a preassigned Zener voltage is provided with two emitter-collector potential sources, one of which supplies a higher potential and the other a lower potential than the Zener breakdown voltage of the transistor. The high potential source is coupled to the transistor through a glow tube that fires when the transistor is rendered conducting by the other potential source and by a trigger pulse of a given polarity applied to the base electrode thereof. Inasmuch as the potential between emitter and base of the transistor now exceeds the Zener breakdown voltage thereof, the transistor remains conducting after the end of the trigger pulse and effectively will be in one stable condition. A succeeding trigger pulse thereafter renders the transistor nonconducting, extinguishing the glow tube and throwing the circuit into its other stable condition. In one embodiment of this invention this second trigger pulse is of the opposite polarity to that of the trigger pulse previously rendering the transistor conducting. In another embodiment, succeeding trigger pulses may be of the same polarity, the transistor being rendered nonconducting by applying the trigger pulse to the collector by means of a half-wave rectifier so as to drive the emitter-collector potential below the Zener voltage of the transistor and simultaneously extinguish the glow tube.

In the embodiment of this invention depicted in FIG. 2, there is shown a p-n-p type junction transistor 211 having a base electrode 215, an emitter electrode 217, and a collector electrode 213. A positive polarity pulse source 201 and negative polarity pulse source 203 are coupled between the base electrode 215 and the emitter electrode 217 by means of half-wave rectifiers 205 and 209, respectively. A first potential source 225 is connected between emitter 217 and collector 213 through a resistor 223, while a second potential source 221 is similarly connected between emitter 217 and collector 213 through a glow tube 219. The magnitude of the output voltage of potential source 225 is chosen so that it is less than the Zener voltage of transistor 211, while the output voltage of source 221 is chosen to be greater than the aforementioned Zener voltage and further is sufficient to fire glow tube 219. The resistance value of resistor 223 is so chosen as to limit the emitter-collector current through transistor 211 to a very low value, preferably of the order of a few microamperes, when glow tube 219 is not ignited and when there is no pulse applied to base 215. The difference in the output voltages of sources 221 and 225 should be less than the extinction voltage of glow tube 219. Glow tube 219 may be a neon tube or any similar device well known to the art.

In a typical selection of component parts, utilizing a p-n-p junction transistor having a Zener voltage of about 45 volts, and a type 57 neon tube, output voltages from sources 221 and 225 of 90 volts and 35 volts respectively were found to be satisfactory. The firing or striking voltage of a type 57 neon tube is about 88 volts and the extinction voltage thereof is about 60 or 65 volts.

As has been taught in the copending application of R. L. Bright and G. H. Royer, Serial No. 420,904, filed on April 5, 1954, entitled Transistor Power Control Circuits, a positive voltage applied between the base and either of the adjacent electrodes of a p-n-p junction transistor will drive the emitter-collector current of the transistor to saturation when the base is at a negative potential with respect to both of the adjoining electrodes, and further that emitter-collector current will be cut off when the base is at a positive potential with respect to either of the adjoining electrodes. The output voltage of pulse source 201 is so chosen as to drive the transistor to saturation so that a very low impedance will be presented between the emitter and collector terminals.

The operation of the transistor in the circuitry described with reference to FIG. 2 is in many respects the same as that of the transistor switch described in the aforementioned Bright et al. application. Let it first be assumed that lamp 219 is in its nondischarging condition and that no pulse is being applied to base 215 by either of pulse sources 201, 203. The emitter-collector current through the transistor 211 will be only a few microamperes, a level determined by the resistance value of resistor 223 and the collector back resistance. When a negative pulse is applied between base 215 and emitter 217 by pulse source 201, the transistor will be rendered conducting and the emitter-collector impedance thereof will drop to a very few ohms (generally less than two ohms). Glow tube 219 will thereupon fire and apply between emitter 217 and collector 213 a voltage equal to the output voltage of potential source 221 less the internal voltage drop of the glow tube. Since the emitter-collector potential is now far in excess of the Zener voltage of the transistor, the emitter-collector current will remain at a relatively high value and the impedance between the emitter and collector terminals will remain at a very low value after the end of the negative pulse.

Negative pulses from pulse source 201 will not affect the operation of the circuit until after a positive pulse is received from pulse source 203. When such a positive pulse is applied between base 215 and emitter 217, the transistor will be rendered nonconducting, the potential hill that formerly limited the emitter-collector current will be restored, the emitter-collector impedance of the transistor will increase to a very high value, and glow tube 219 will be extinguished.

The output voltage applied across terminals 229, 231 through capacitor 227 will be a rectangular wave alternating between a potential essentially the same as the output of the source 225 when glow tube 219 is non-conducting to a potential essentially the same as that source 221 minus the glow tube voltage drop when glow tube 219 is conducting.

In FIG. 3 there is described another embodiment of this invention adapted for use with a single source of unipolarity control pulses. It will be noted that in FIGS. 2 and 3 reference numerals wherein the last two digits are similar refer to identical circuit components. In this embodiment, potential sources 321 and 325 are connected between emitter 317 and collector 313 of transistor 311 through glow tube 319 and resistor 323 respectively, in the same manner as described with reference to FIG. 2. Likewise the capacitor 327 connects collector 313 to output terminal 329, and output terminal 331 is connected directly to emitter 317. A capacitor 310 is utilized to connect the output pulses of negative pulse source 303 to base 315. Additionally, serially connected rectifier 314 and resistance 316 are connected between base 315 and collector 313. Rectifier 314 is poled so as to permit current conduction from collector to base of the transistor. The resistance value of resistor 316 is of such a value that a negative pulse from source 303 applied to the collector through rectifier 314 will be less than the amplitude of the pulse times the current gain of the transistor.

In describing the operation of this embodiment, let it again be assumed that glow tube 319 is nonconducting and that no pulse has been applied to base 315 so that the emitter-collector impedance of transistor 311 is at a very high value. A pulse from source 303 will be simultaneously applied to base 315 and collector 313. However, since the amplitude of the pulse as applied to the base is greater than the amplitude as applied to the collector, the transistor will be rendered conducting by the pulse and the emitter-collector impedance of the transistor will drop to a very low value. Glow tube 319 will fire, applying a voltage between the emitter and collector in excess of the Zener breakdown voltage of the transistor. The transistor will suffer a Zener breakdown and will remain conducting after the termination of the pulse. The next pulse from source 303 will not affect the operation of the transistor insofar as its application to the base is concerned. However, if the output of pulse source 303 is of sufficient magnitude, the emitter-collector voltage will be driven below the Zener voltage of the transistor. Simultaneously, the voltage across the glow tube 319 will be driven below the minimum voltage that will support conduction therethrough and the glow tube will be extinguished. Therefore, the transistor will be rendered nonconducting as the only voltage across the emitter and collector electrodes thereof is that of potential source 325, which voltage is below the Zener breakdown voltage of the transistor. Subsequent pulses from source 303 will alternately render the transistor conducting and nonconducting, and fire and extinguish the glow tube 319 as described above.

Here again, the output across terminals 329, 331 will be a rectangular wave as described with reference to FIG. 2.

Following the teachings of this invention, there has been produced a bistable triggering circuit making use of junction transistors that is quite insensitive as regards variations in the characteristics of the individual transistors used therein. The device has been found to operate satisfactorily with fixed circuit constants utilizing substandard transistors that were classified as rejects by the manufacturing concern making the transistors.

Since numerous changes may be made in the above described construction and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. A bistable triggered circuit comprising: a gaseous discharge device having a firing voltage of greater amplitude than the extinction voltage thereof; a first potential source, switch means coupling said gaseous discharge device across said first potential source including transistor means having a Zener breakdown voltage less than the output voltage of said first potential source and including emitter, base and collector electrodes, said emitter and base electrodes being connected to couple said gaseous discharge device to said first potential source through the emitter-collector current conduction path of said transistor means; pulsed control means coupled between said base and emitter electrodes adapted to render said transistor alternately conducting and nonconducting; unilateral conduction means coupling the output of said pulsed control means to said collector electrode to drive the collector-emitter voltage below the Zener voltage of said transistor when said gaseous discharge device is conducting; and second potential means connected in parallel with said serially connected gaseous discharge device and first potential source, having an output voltage less than the Zener breakdown voltage of said transistor, the difference of the output voltages of said first and second potential sources being less than the extinction voltage of said gaseous discharge device.

2. A bistable triggered circuit comprising: a gaseous discharge device having a firing voltage of greater amplitude than the extinction voltage thereof; a first potential source, switch means coupling said gaseous discharge device across said first potential source including transistor means having a Zener breakdown voltage less than the output voltage of said first potential source and including emitter, base and collector electrodes, said emitter and base electrodes being connected to couple said gaseous discharge device and said first potential source through the emitter-collector current conduction path of said transistor; pulsed control means coupled between said base and emitter electrodes adapted to render said transistor alternately conducting and non-conducting; serially connected unilateral conducting means and resistace means coupling the output of said pulsed control means to said collector electrode, said resistance means being adapted to render the amplitude of voltage pulses applied to said collector electrode through said unilateral conducting means less than the product of the amplitude of the control voltage pulses and the voltage gain of said transistor means.

3. A bistable triggered circuit comprising: transistor means including emitter, base, and collector electrodes having a given reverse voltage breakdown point, a first emitter-collector voltage supply means adapted to supply a first potential greater than said given reverse voltage and a second emitter-collector voltage supply means adapted to supply a second potential less than said given reverse voltage, two-electrode gaseous conduction means coupling said first voltage supply means between said emitter and collector electrodes of said transistor means, impedance means coupling said second voltage supply means between said emitter and collector electrodes of said transistor, and control voltage means coupled to said base electrode for selectively rendering said transistor means conducting and non-conducting.

4. A bistable triggered circuit comprising: transistor means including emitter, base, and collector electrodes having a given reverse voltage breakdown point, first emitter-collector voltage supply means adapted to supply a first potential greater than said given reverse voltage and a second emitter-collector voltage supply means adapted to supply a potential less than said given reverse voltage, gaseous conduction means coupling said first potential to said transistor emitter-collector circuit, impedance means coupling said second potential to said transistor emitter-collector circuit, and reversible-polarity control voltage means coupled between said base and emitter electrodes for selectively rendering said transistor means conducting and non-conducting.

5. A bistable triggered circuit comprising: transistor means including emitter, base, and collector electrodes having a given reverse voltage breakdown point, first emitter-collector voltage supply means adapted to supply a first potential greater than said given reverse breakdown voltage and second emitter-collector voltage supply means adapted to supply a second potential less than said given reverse breakdown voltage, gaseous conduction means coupling said first potential to said transistor emitter-collector circuit, impedance means coupling said second potential to said transistor emitter-collector circuit, pulsed control voltage means coupled between said base and emitter electrodes of said transistor adapted to render said transistor conducting; and means coupling said control voltage means to said collector electrode adapted to drive the emitter-collector voltage below said reverse breakdown voltage when said gas tube is conducting.

6. A bistable triggered circuit comprising: a gas discharge tube having a given striking voltage and a given extinction voltage lower than said striking voltage; transistor means including emitter, base and collector electrodes and having a Zener breakdown voltage less than said extinction voltage; first emitter-collector potential supply means coupled to said transistor emitter-collector circuit by means of said gas discharge tube and having an output voltage at least as great as said striking voltage; second emitter-collector potential supply means having a second output voltage less than said Zener voltage and connected in parallel with said first potential supply means and said gas tube in series; and control voltage means coupled to said base electrode and an adjoining electrode for selectively rendering said transistor conducting and non-conducting.

7. A bistable triggered circuit comprising: a gas discharge tube having a given striking voltage and a given extinction voltage lower than said striking voltage; transistor means including emitter, base and collector electrodes and having a Zener breakdown voltage less than said extinction voltage, first emitter-collector potential supply means coupled to said transistor emitter-collector circuit by means of said gas discharge tube and having an output voltage at least as great as said striking voltage; second emitter-collector potential supply means having a second output voltage less than said Zener voltage and connected in parallel with said first potential supply means and said gas tube in series; a voltage pulse source coupled between said base and said emitter adapted to render said transistor means conducting; and means coupling said pulse source across said gas tube and first potential supply means in series adapted to drive the emitter-collector potential of said transistor below the Zener voltage thereof when said gas tube is conducting.

8. A triggering circuit comprising: transistor means including emitter, base, and collector electrodes, said transistor having a given reverse voltage breakdown point, emitter-collector voltage supply means adapted to supply a potential somewhat less than said given reverse voltage breakdown point, impedance means connecting said voltage supply means between said emitter and collector electrodes of said transistor, and control means coupled to said base electrode and said emitter for selectively rendering said transistor means conducting and non-conducting.

9. A triggering circuit comprising: transistor means including emitter, base, and collector electrodes, said transistor having a given reverse voltage breakdown point, emitter-collector voltage supply means adapted to supply a potential somewhat less than said given reverse voltage breakdown point, impedance means connecting said voltage supply means between said emitter and collector electrodes of said transistor, a plurality of parallelly connected signal producing circuits connected to the base of said transistor to cause said transistor to become conducting or non-conducting repending on the signals received at the base of the transistor from the signal producing circuits.

References Cited in the file of this patent

UNITED STATES PATENTS

| | | |
|---|---|---|
| 2,593,375 | Williams et al. | Apr. 15, 1952 |
| 2,848,653 | Hussey | Aug. 19, 1958 |
| 2,851,638 | Wittenberg | Sept. 9, 1958 |
| 2,861,199 | Henle | Nov. 18, 1958 |
| 2,876,387 | Doelman | Mar. 3, 1959 |
| 2,927,247 | Hennis | Mar. 1, 1960 |